May 26, 1964   R. L. DREYFUS   3,134,679
METHOD OF PACKAGING HORTICULTURAL PRODUCTS
Filed March 28, 1960

United States Patent Office 3,134,679
Patented May 26, 1964

3,134,679
METHOD OF PACKAGING HORTICULTURAL PRODUCTS
Robert L. Dreyfus, Arlington, Mass., assignor to W. R. Grace & Co., Cambridge, Mass., a corporation of Connecticut
Filed Mar. 28, 1960, Ser. No. 17,872
1 Claim. (Cl. 99—171)

The present invention relates to a novel package and method of packaging and, more specifically, to a package for and a method of packaging horticultural products.

It is often desirable in packaging certain horticultural products that a transparent, tough, flexible, protective covering having a low water vapor transmission rate be employed.

Previously it had been known to employ paper coverings, films of non-shrinkable plastic and shrinkable plastic films. These materials have not been completely satisfactory. Paper as a covering is unsatisfactory and has generally been replaced by transparent films. Non-shrinking transparent plastic films do not provide a package having a neat and attractive appearance as do the shrinking films. The shrinking films heretofore employed have not been strong enough or tight enough to produce a satisfactory package. Heat shrinkable plastic films have been tried, but these materials normally become tacky when heated and do not have sufficient shrinkability below their plasticizing temperature to provide a tight package or covering. In addition, such heat shrinkable materials have a tendency to lose their tear strength when heated and then cooled and thus do not provide a sufficiently strong, tough package.

In the present invention, there is employed as packaging material solid polymers of olefins having 2 to 3 carbon atoms, i.e., polyethylene and polypropylene which polymers have been biaxially or monoaxially oriented.

More specifically there is employed in the invention polyethylene film or tubing which has been irradiated to an extent of 2 to 100 megarads, preferably 6 to 20 megarads. The irradiation can be accomplished in conventional fashion, e.g., by the use of a high voltage resonant transformer, such as the 2,000,000 volt General Electric resonant transformer, or high energy particle generators of 50,000 to 50,000,000 volts or a Van de Graaf electron generator. In addition to the use of electrons for irradiating the polyethylene, there can be employed beta rays, gamma rays, e.g. by employing cobalt 60, etc. There can be employed any of the irradiation procedures disclosed in Baird et al. application, Serial No. 713,848, filed February 7, 1958, now U.S. Patent 3,022,543, or Rainer Patent 2,877,500. The disclosures of the Baird et al. application and Rainer patent are hereby incorporated by reference.

Orientation of the film may be accomplished by monoaxial or biaxial stretching. Such film may be stretched 100% to 700% longitudinally and 100% to 900% laterally. The biaxially stretching can be carried out by blowing the irradiated polyethylene tubing as disclosed in the Baird application. The biaxially oriented polyethylene prepared by such a procedure has a high shrink energy, e.g. 100 to 500 p.s.i. at 96° C.

There can be employed as a starting polyethylene for the irradiation procedure high, medium or low density polyethylene prepared by high or low pressure techniques. The starting polyethylene can have a molecular weight of 7,000; 9,000; 12,000; 19,000; 21,000; or 35,000 or even higher.

In place of irradiated polyethylene, there can be employed irradiated or non-irradiated polypropylene. The polyethylene or polypropylene in either case must be monoaxially or biaxially oriented.

It is an object of the present invention to provide a method of packaging somewhat spherically shaped horticultural products in a transparent protective film.

It is a further object to partially encapsulate such products without the necessity of using glues, tape or other means of sealing the ends of the film.

A further object is to partially encapsulate such products so that ventilation necessary to maintain adequate storage life is possible.

These and other objects of the present invention will appear more fully in the following specification and claims taken in conjunction with the accompanying drawings in which:

Figure 1:
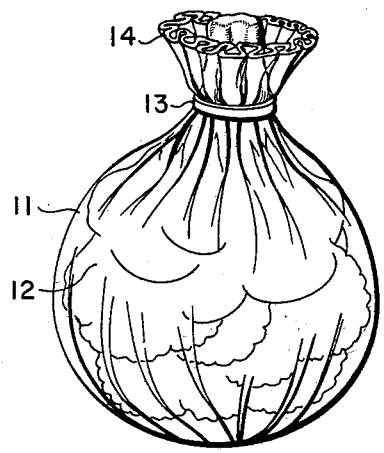
FIGURE 1 is a perspective view of a somewhat spherical object partially encapsulated within a sheet of heat shrinkable, oriented thermoplastic film.
Figure 2:
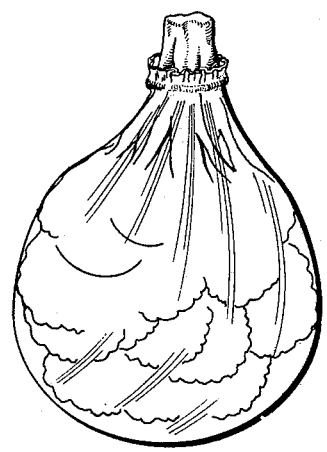
FIGURE 2 is a view of the completed package.

A sheet of biaxially oriented, irradiated polyethylene film 11 of a diameter approximately equal to the circumference of the object 12 to be packaged, in this case a head of cauliflower, is placed on a suitable flat surface. The head of cauliflower is placed stem up and head down on the film. The ends 14 or outside circumference of the film are drawn upward and gathered together around the stem of the cauliflower. At a point approximately 3" from the ends of the film and approximately one-fourth of the way down the stem, the film is clamped to the cauliflower by means of an annular resilient ring 13. Heat from a hot air gun capable of producing temperatures in the range of 400°–600° F. is directed against the exposed ends of the film causing the ends to shrink. The ends of the film are shrunk until a snug fit against the stem is obtained or until the circumference of the end of the film has been reduced in size so that its diameter is less than the diameter of the head of the cauliflower. At this point there may be a number of wrinkles and places where excess film detracts from the appearance of the package. An additional brief exposure of the entire package to heat will cause the film to shrink eliminating these wrinkles thereby producing a neat, tight partially encapsulated package.

The polyethylene film used in the above package was prepared by irradiating Alathon 14 (polyethylene, molecular weight about 20,000, density 0.916) to a dosage of 12 megarads. The film was biaxially oriented by being stretched 350% in both directions. The film so produced has a shrink energy in one direction of at least 250 p.s.i. at 96° C.

Other horticultural products can be similarly packaged by the method of the present invention. Potted plants, for example, can be packaged by placing a sheet of film over the foliage and shrinking the edge or ends of the film about the stem. Cabbage can be packaged by placing a sheet of film over the top and shrinking the ends of the film near the base.

Aside from providing a neat, attractive and transparent protective package, this method also eliminates the need for clips, adhesives, glues, tapes, etc. or other means for sealing ends and further provides for a portion of the product to be exposed so that ventilation necessary to maintain storage life of the product is possible.

The invention, described in detail in the foregoing specification is susceptible to changes and modifications, both as to method and resulting articles without departing from the principle and spirit thereof. For this reason the terminology used in the specification is for purpose of description and not of limitation. The scope of the invention is defined in the claim.

Having described my invention what I claim as new and desire to secure by Letters Patent is:

The method of packaging horticultural products which possess enlarged heads and comparatively slender stems which comprises drawing a sheet of transparent, heat-shrinkable, thermoplastic film over the head of the product, gathering the edge area of the film into a skirt surrounding the stem, clamping the skirt to the stem at a point remote from the margin of the skirt, then directing hot air at a temperature of between 400° F. and 600° F. on the area of the skirt exposed beyond the clamp for a time sufficient to shrink the skirt into a tight neck-seal snugly fitted about the stem, and thereafter briefly exposing the entire package to heat sufficient only to remove slack and wrinkles from the material enclosing the head, whereby tearing and excessive weakening of the film surrounding the head is avoided.

References Cited in the file of this patent

UNITED STATES PATENTS

| | | |
|---|---|---|
| 1,685,393 | Beadle | Sept. 25, 1928 |
| 2,538,025 | Moore | Jan. 16, 1951 |
| 2,762,720 | Michel | Sept. 11, 1956 |
| 2,865,765 | Allen | Dec. 23, 1958 |
| 2,877,500 | Rainer et al. | Mar. 17, 1959 |
| 2,878,174 | Rainer et al. | Mar. 17, 1959 |
| 2,906,627 | Payton et al. | Sept. 29, 1959 |
| 2,911,305 | Rumsey | Nov. 3, 1959 |
| 2,987,402 | Dold | June 6, 1961 |